(12) United States Patent
Hosokawa (10) Patent No.: US 7,472,410 B2
(45) Date of Patent: Dec. 30, 2008

(54) VIDEO TRANSMISSION APPARATUS FOR CONNECTING TO A NETWORK

(75) Inventor: Noboru Hosokawa, Sayama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1160 days.

(21) Appl. No.: 10/083,351

(22) Filed: Feb. 27, 2002

(65) Prior Publication Data

US 2002/0124122 A1      Sep. 5, 2002

(30) Foreign Application Priority Data

Mar. 2, 2001   (JP) .............................. 2001-058716
Dec. 27, 2001  (JP) .............................. 2001-396685

(51) Int. Cl.
   *H04N 7/16*   (2006.01)
   *H04N 5/225*  (2006.01)
   *G06T 9/00*   (2006.01)

(52) U.S. Cl. .................. 725/146; 348/207.99; 345/555

(58) Field of Classification Search ................. 725/146; 348/207.99; 345/555
   See application file for complete search history.

(56) References Cited

U.S. PATENT DOCUMENTS 5,345,559 A *  9/1994  Okazaki et al. ............... 710/53
5,793,996 A *  8/1998  Childers et al. ............. 710/306
6,683,642 B1 * 1/2004  Kobayashi et al. ........ 348/231.2
6,900,847 B1 * 5/2005  Agneta et al. ............... 348/552
6,940,911 B2 * 9/2005  Sugiyama .............. 375/240.26
2001/0013076 A1 * 8/2001  Yamamoto .................... 710/33

FOREIGN PATENT DOCUMENTS

JP    2000152286       5/2000
JP    2002124775 A  * 10/2000

OTHER PUBLICATIONS

Hitachi, HD74LVC245A Octal Bidirectional Transceivers with 3-state Outputs, Dec. 1996, Hitachi Semiconductore, ADE-205-111B(Z), 3$^{rd}$ Edition.*

* cited by examiner

*Primary Examiner*—Hoang-Vu A Nguyen-Ba
(74) *Attorney, Agent, or Firm*—Mattingly, Stanger, Malur & Brundidge, P.C.

(57) ABSTRACT

A video transmission apparatus for connecting to a network has a peripheral block including a video processing unit for generating compressed video data of video signals and a network control unit for controlling transmission and reception of compressed video data through a transmission medium such as a network, and a central processing unit block including a storage unit for storing the compressed image data, a central processing unit for executing data processing and a central control unit for controlling each of these units in cooperation with the central processing unit, each of the units inside the peripheral block and inside the central processing unit block is successively connected in series by first and second buses, and the first and second buses are connected through a bus buffer.

9 Claims, 6 Drawing Sheets

FIG.6A POINT a

FIG.6B POINT b

FIG.6C POINT c

FIG.6D POINT d

FIG.6E POINT e

FIG.6F POINT f

FIG.6G POINT g

VIDEO TRANSMISSION APPARATUS FOR CONNECTING TO A NETWORK

BACKGROUND OF THE INVENTION

This invention relates to a video transmission apparatus connected to a network. More particularly, this invention relates to a video transmission apparatus for increasing a quantity of data that can be transmitted through a network.

A video transmission apparatus for connecting to a network converts video signals taken by an imaging device such as a camera from analog signals to digital signals (A/D conversion) and acquires video data. Each frame of the video signal constitutes this video data, and data compression is made by a video coding system such as JPEG (Joint Photographic Experts Group), for example. The compressed video data so obtained is transmitted to a reception apparatus connected to a transmission medium such as network typified by LAN (Local Area Network) and WAN (Wide Area Network). Further, the video transmission apparatus for use with a network receives the compressed video data from the transmission medium such as the network, expands the compressed video data and outputs video data or displays it on a monitor.

To accomplish a low cost and multiple functions, the video transmission apparatus for connecting to a network employs CPU (Central Processing Unit) for its data processing portion. For example, CPU reads the compressed video data from a JPEG compression circuit that compresses the video data by the video coding system JPEG, and stores it in a storage device such as a memory. Further, CPU reads out the compressed video data stored in the storage device, formats it into a predetermined format, again stores the compressed video data so formatted and then transmits it at predetermined timing through the transmission medium to a network control circuit for controlling data transmission and reception. The network control circuit converts the formatted compressed video data to data that is reconstituted into a format corresponding to a communication protocol of the network, and transmits it to the network.

As described above, the data processing of CPU includes data transmission for acquiring the compressed video data from the JPEG compression circuit and storing the data into the storage device, data transmission for acquiring the compressed video data, formatting it to the predetermined format and again writing the compressed image data so formatted into the storage device, and data transmission for transmitting the compressed video data formatted into a predetermined format to the network control circuit. To conduct these data transmission operations at a high speed, some video transmission apparatuses employ a plurality of dedicated bus systems. Such a dedicated bus system includes a dedicated bus that enables CPU to simultaneously and independently exchange data with the JPEG compression circuit and with the network control circuit besides a bus system through which CPU gains access to data for an execution command of CPU itself and to data to be processed.

Recent CPU has a plurality of DMA (Direct Memory Access) transmission functions for executing data access with a built-in buffer and with external equipment independently of command execution of CPU itself, and a plurality of interfaces for exchanging data by using the DMA transmission functions under the state where no processing load is applied to CPU itself.

CPU can connect the JPEG compression circuit or the network control circuit by using this DMA transmission function and the interface through the dedicated buses. When a predetermined quantity of data is stored in the built-in buffer by the DMA transmission function, CPU reads the data from the built-in buffer, executes a predetermined data processing, and stores the data so processed into the storage device or simultaneously exchanges the data processed in a predetermined way with the network control circuit by using other DMA transmission function.

SUMMARY OF THE INVENTION

The system described above that uses a plurality of dedicated buses invites not only the increase of the packaging area of signal wiring of each bus but also the increase of various loads such as the stray capacitance occurring in the signal wiring of each dedicated bus, so that a driving current for driving the transmission signal by the bus increases. To avoid the increase of the packaging area and the driving current resulting from the dedicated buses, the data transmission described above employs a time division method by using the system bus of CPU in place of the dedicated bus system. In this method, the system bus bears the data transmission function of the JPEG compression circuit, the network control circuit and the storage device.

CPU uses the system bus in time-sharing and schedules the processing for efficiently transmitting the data lest fall-off of the compressed video data from the JPEG compression circuit and interrupt of the transmission data to users occur. CPU has also to cope with irregular processing requests of input/output, and since data transmission or data processing is temporarily interrupted, processing efficiency of CPU drops.

A method that makes up for the drop of processing efficiency of CPU employs CPU having a higher processing speed and a storage device accessible at a higher speed (for example, a memory capable of burst transmission in synchronism with a clock) and improves a data transmission rate on a system bus. When the transmission rate on the system bus is improved, however, influences of signal refection that incurs data error on a transmission path and cross-talk noise appear as distortion of a signal waveform due to various factors such as the relation between a signal rise or fall time and a signal propagation time and packaging of a signal wire of the system bus.

The occurrence of reflection invites the occurrence of distortion of the waveform such as overshoot and under-shoot in the transmission signal, a data error beyond a threshold value for identifying the signal, cross-talk noise and eventually, an unstable operation.

Figure 5:
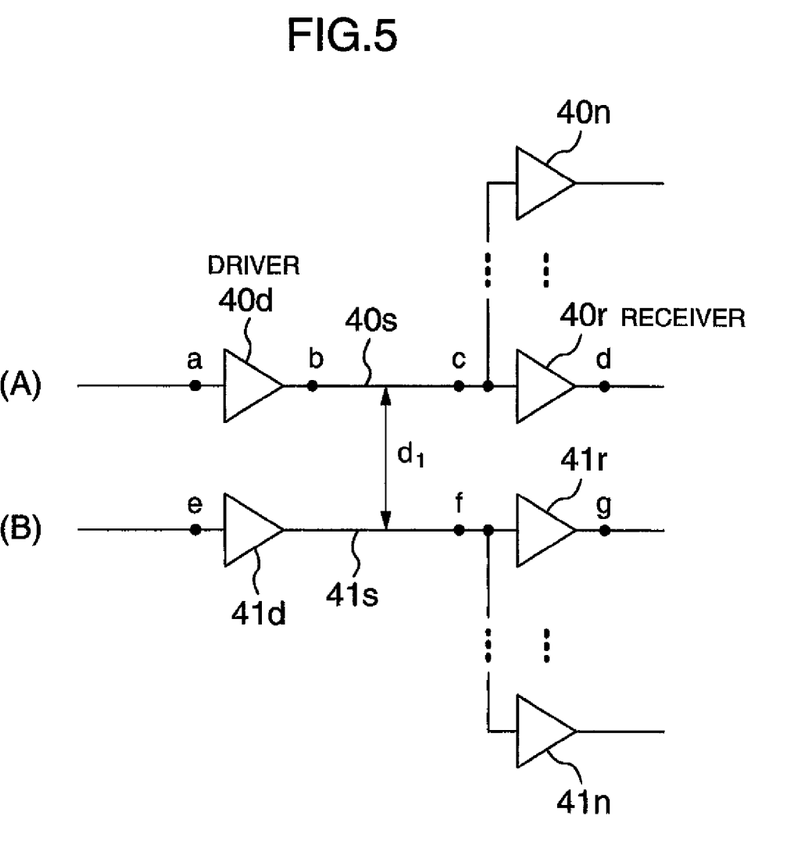
FIG. 5 shows a part of a bus structure through which data is exchanged.

Such phenomena will be explained with reference to FIG. 5 and FIGS. 6A to 6G. It will be assumed that a part of the construction of the bus for exchanging data has a construction shown in FIGS. 5(A) and (B). In FIG. 5(A), a driver 40d and receivers 40r to 40n are shown connected by a signal line 40s. In FIG. 5(B), a driver 41d, receivers 41r to 41n and a signal line 41S constitute a part of the bus in the same construction as FIG. 5(A) but with a distance d1 from FIG. 5(A). When a pulse waveform exists at an input point a of the driver 40d in FIG. 6A, it changes to a pulse waveform at an output point b of a driver 40d in FIG. 6B.

Figure 6A:
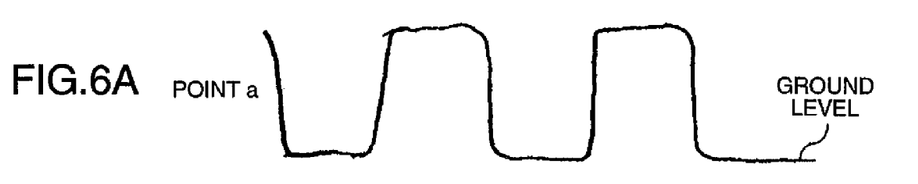
FIGS. 6A to 6G are signal waveform diagrams at each part of the bus shown in FIG. 5 and are useful for explaining the causes of the occurrence of data errors.
Figure 6B:
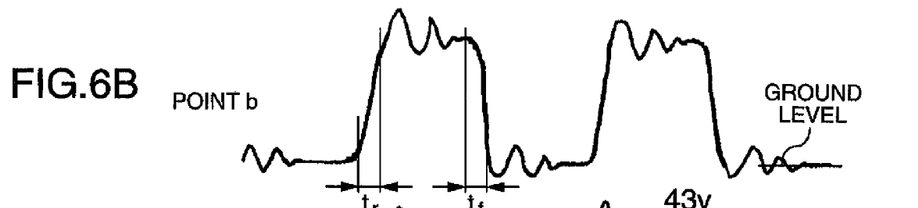
Figure 6C:
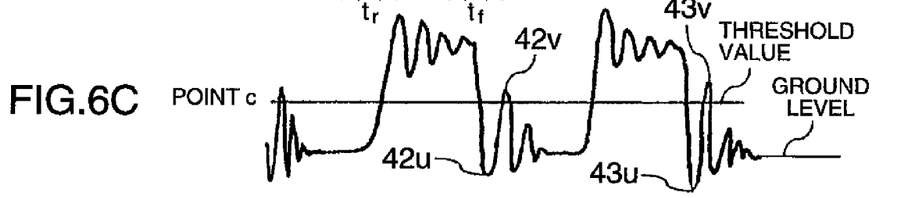

To transmit a signal at a high transmission rate, it is necessary improve the driving capacity of the driver 40d and to much more shorten the rise time tr or fall time tf of the pulse waveform driven on the bus. Then, the reciprocation time τ required for the signal of the pulse waveform driven from the driver 40d to reciprocate on the signal line 40s to the receiver 40r sometimes becomes longer than the rise time tr and the fall time tf of the signal of the pulse waveform driven by the driver 40d shown in FIG. 6B. In such a time relationship of τ >tr, tf, the signal reaches the reception end (input point c) of the receiver 40r after its fall and is reflected. In consequence, undulating under-shoots 42u and 43u and undulating over-shoots 42v and 43v occur at the input point c in FIG. 6C. Similar phenomena occur after the signal rise, too. When the receiver 40r receives the signal of the pulse waveform shown in FIG. 6C and the signal exceeds a threshold value of a signal level of the receiver 40r in a time zone of the occurrence of the over-shoots 42v and 43v, signals as noises 44n and 45n shown in FIG. 6D occur. As a result, a data error or a factor inviting an unstable operation of the circuit occurs on the reception side. Though this explanation deals with the occurrence of the noise after the signal fall, similar data error and factor for the unstable operation of the circuit likewise occur due to the undulating distortion of the pulse waveform after the signal rise.

Figures 6D, 6E, 6F:
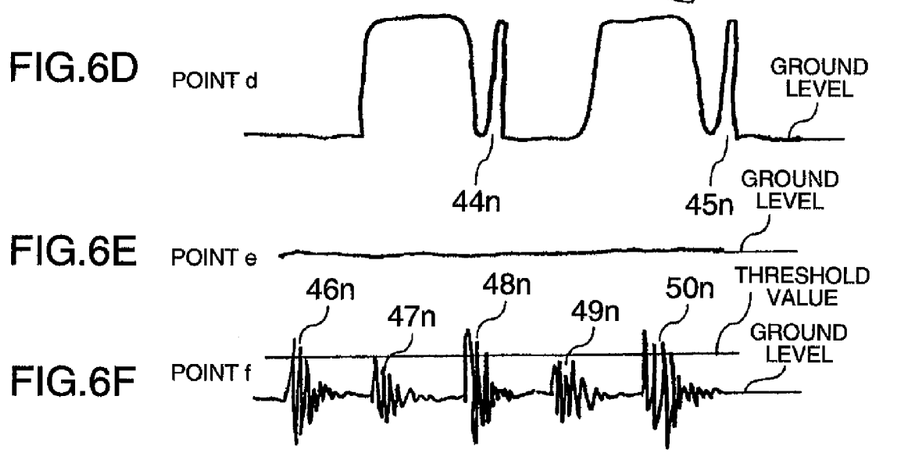
Figure 6G:
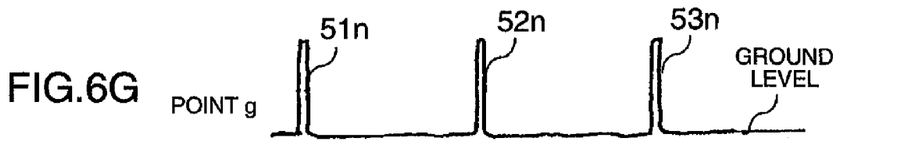

Turning back again to FIG. 5(B), cross-talk noises 46n to 50n overlap with the signal line 41s having the distance d1 shown in FIG. 5 if high-speed signal rise and fall of the pulse waveform shown in FIG. 5(A) or the under-shoots and over-shoots resulting from the former exist when the signal is under the zero level condition in FIG. 5(B) (see also FIG. 6E). When these cross-talk noises 46n to 50n exceed the threshold value of the signal level of the receiver 41r, signals as the noises 51n, 52n and 53n develop as shown in FIG. 6G. In this case, too, these noises invite the occurrence of the data error or the unstable circuit operation on the reception side. When the noises 44n and 45n shown in FIG. 6D or the noises 51n, 52n and 53n shown in FIG. 6G occur on the signal line of the bus to the storage device, for example, the data error occurs in such a fashion that data of the logic "1" is written though the data of the logic "0" should be originally written. When the noise occurs on the control signal line of the memory, unstable control or unstable data access is made. If other connection circuit occupies the bus at this time, collision of the signals on the bus occurs and the circuit operation gets unstable.

For these reasons, a video transmission apparatus for use with a network, that has a sufficient high operation speed, has not been accomplished although speedup of the signal transmission has been attempted as described above. As a result, the upper limit of the quantity of video data taken by the camera that can be transmitted through the network is kept at a low level, and the limit of the transmission service remains unsolved.

Data processing and data transmission of the compressed video data or input/output processing is a great processing burden to CPU. If the quantity of the compressed video data having a frame rate of 30 fps (frames/second) that can be transmitted to one user is about 3.6 Mbps (Megabits/sec) in a video transmission apparatus for connecting to a network according to the prior art, for example, the number of users to which the compressed video data can be simultaneously transmitted is limited to 2 or below, and the quantity of data that can be transmitted is about maximum 7.2 Mbps.

When the transmission data quantity to one user is doubled to obtain high-quality reproduction images on the reception side under such a processing capacity of CPU, the number of users to which the compressed video data of 30 fps can be simultaneously transmitted is at most one user, and the video transmission service drops. If the number of transmissible users is doubled to four users, on the contrary, the data quantity transmissible to one user drops to the half, and only reproduction images of low image quality can be acquired. Alternatively, there is a method that reduces the frame rate from 30 fps to 15 fps. This method can secure image quality of each frame though the number of frames decreases. However, this method is not free from the problem that the reproduction images become unnatural in the case of images having motion.

It is an object of the present invention to provide a video transmission apparatus for connecting to a network that improves transmission services by increasing the transmissible data quantity of images taken by a camera through a network.

It is a more concrete object of the invention to provide a video transmission apparatus for connecting to a network that can simultaneously transmit compressed video data in a data quantity of at least 3.6 Mbps per user to at least four users.

It is another more concrete object of the invention to provide a video transmission apparatus for connecting to a network that can simultaneously transmit compressed video data in a data quantity of at least twice, that is, 7.2 Mbps per user, to at least two users.

According to one aspect of the invention, there is provided a video transmission apparatus for connecting to a network, comprising a central processing unit block and a peripheral block, wherein the peripheral block includes a video processing unit for processing video signals from an imaging device and generating video data, a network control unit for controlling transmission and reception of the video data transmitted and received through a transmission medium inclusive of a network, and a first bus for connecting in series the video processing unit and the network control unit; wherein the central processing unit block includes a central processing unit for processing the video data, a storage unit for storing the video data from the video processing unit, a central control unit for controlling the video processing unit, the network control unit and the storage unit in cooperation with the central processing unit, and a second bus for connecting in series the central processing unit, the storage unit and the central control unit; and wherein the first bus and the second bus are connected through a first buffer.

According to one of the preferred features of the invention, the central processing unit and the central control unit described above control the video processing unit, process the video signals from the imaging device and stores the compressed video data into the storage unit in a cycle of 1/30 fps and at a data transmission rate of at least 3.6 Mbps through the first bus, the first bus buffer and the second bus.

According to another preferred feature of the invention, the central processing unit and the central control unit read the compressed video data from the storage unit at a data transmission rate of at least 14.4 Mbps in accordance with a request of four users from the network control unit, and transmit the compressed video data to the network control unit through the second bus, the first buffer and the first bus.

The second bus is preferably constituted in such a fashion that a second bus buffer is connected in series to the second bus and a third bus having expansion connectors connected thereto is connected to the second bus buffer. In the third bus, a video expansion unit is connected in series to the expansion connectors and a monitor is connected to the video expansion unit.

The second bus provided to the central processing unit block preferably connects the central processing unit, the storage unit, the central control unit and the bus buffer in order named, and the first bus provided to the peripheral block preferably connects the bus buffer, the network control unit and the video processing unit in order named.

A circuit for displaying the operating condition of the video transmission apparatus for connecting to a network and a switch circuit for setting operations of this video transmission apparatus are preferably connected in series to the first bus.

To reduce signal reflection and unnecessary radiation, a dumping resistor is preferably connected to the starting point or the end point of each of the first and second buses, and a terminating resistor is preferably connected to the other.

The peripheral block and the central block are preferably arranged on the same packaging board. The central processing unit and the central control unit are preferably positioned at a central block which is located at a substantial center of the packaging board and the peripheral block is preferably disposed at a peripheral area of the central block of the packaging board.

Other objects, features and advantages of the invention will become apparent from the following description of the embodiments of the invention taken in conjunction with the accompanying drawings.

DESCRIPTION OF THE EMBODIMENTS

Video transmission apparatuses for connecting to a network according to several embodiments of the invention will be hereinafter explained with reference to the accompanying drawings, wherein same reference numerals will be used to identify same constituent members.

To begin with, a construction of a video transmission apparatus for connecting to a network according to one embodiment of the invention and its operation will be explained with reference to a conceptual view of FIG. 3. Reference numeral 30 denotes a video transmission apparatus for use with a network. Reference numeral 1 denotes CPU. Reference numeral 5 denotes ROM (Read-Only Memory) storing a processing program data that describes a processing sequence of CPU 1. Reference numeral 3 denotes RAM (Random Access Memory) that receives and stores compressed video data or the processing program data transmitted from ROM 5 before the start of processing. Reference numeral 4 denotes a central control circuit for controlling access to CPU 1, RAM 3, ROM 5 and each circuit inside a peripheral circuit block 32 to be described later. Reference numerals 2 and 6 denote a peripheral circuit bus buffer and an expansion external bus buffer having a driver function and a receiver function for exchanging data signals between the later-appearing peripheral block 32 and a CPU block 31. These connection circuits are connected in series by a CPU bus A without any branch in the order of RAM 3, ROM 5, the central control circuit 4, the peripheral circuit bus buffer 2 and the expansion external bus buffer 6 with CPU 1 being the starting point.

The series connection in which each connection circuit does not have any branch like a single "railroad track" will be hereinafter called the "series connection". When these connection circuits are connected in series connection, the occurrence of signal reflection and cross-talk noise during high-speed signal transmission can be suppressed. For, if the bus has a branching wiring pattern, discontinuity of transmission path characteristic impedance of the wiring pattern develops at a branch point, and signal reflection and cross-talk noise occur during high-speed signal transmission.

Incidentally, it is of course possible to replace RAM 3 by SDRAM (Synchronous Dynamic RAM) and ROM 5 by flash memory capable of remote rewriting the processing program data of CPU 1 (in other words, capable of rewriting the program already stored to a program inputted from outside under control from outside).

Figure 3:
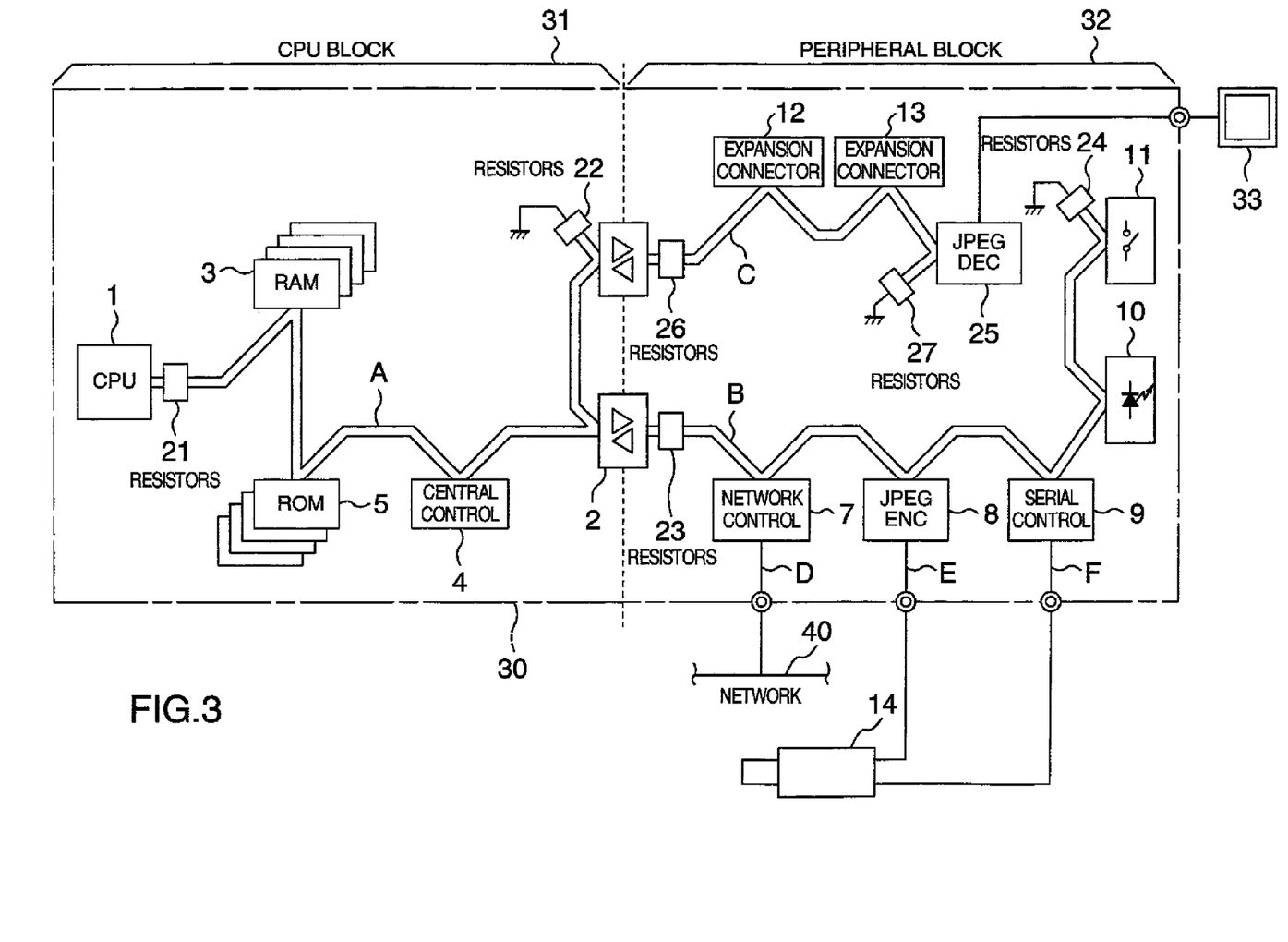
FIG. 3 shows a concept of a video transmission apparatus for connecting to a network according to another embodiment of the invention.

Further referring to FIG. 3, reference numeral 14 denotes a camera. Reference numeral 9 denotes a serial control circuit for conducting imaging control (zooming, focusing, etc) of the camera 14 by using a serial communication signal F (such as RS-232C and RS-485 in accordance with the serial transmission standard). Reference numeral 8 denotes a JPEG compression circuit for converting the video signals inputted from the camera 14 from analog signals to digital signals (A/D conversion), compressing the digital video signals to compressed video data of the video coding system JPEG, and temporarily storing this compressed video data. Reference numeral 7 denotes a network control circuit for receiving the compressed video data after it is formatted to a predetermined format, and transmitting the data D to a network 40 in accordance with a communication protocol corresponding to the network 40. Reference numeral 10 denotes an LED circuit for notifying an operator of the video transmission apparatus of its operating condition of the video transmission apparatus for connecting to a network (such as the number of accesses of transmission requests, transmission overflow, operation defect, and so forth) by means of turn ON/OFF or blinking of LED (Light Emitting Diodes), for example. Reference numeral 11 denotes a switch circuit to which information for designating the operation or the function of the video transmission apparatus for connecting to a network (hereinafter merely called "designation information") is set and from which this information is read by CPU 1.

The designation information of the operation or the function includes, for example, normal or test mode designation of the video transmission apparatus 30 for connecting to a network, a reset request, the number of users for simultaneous transmission, a maximum transmission rate per user, and so forth. A peripheral circuit bus B connects these circuits connected to the buses (hereinafter called "connection circuits") in the form of series connection, and the connection circuits exchange data with external equipment or with the network of the video transmission apparatus 30. Incidentally, it is of course possible to replace the JPEG compression circuit 8 by an MPEG compression circuit that conducts moving picture compression by a moving picture compression system MPEG (Moving Picture Experts Group).

The peripheral block 32 includes expansion connectors 12 and 13.

Besides the peripheral circuit bus B, an expansion external bus C connects these connection circuits in series connection. An add-in board for optional use can be mounted to the expansion connectors 12 and 13. For example, a MODEM board for connection with a telephone line, an ISDN (Integrated Services Digital Network) board for connection with ISDN line, a contact input/output board for controlling external equipment, etc, can be fitted.

A JPEG expansion circuit 25 for expanding the compressed video data that is subjected to data compression by the video coding system JPEG and a later-appearing terminal resistor 27 are also series-connected to the expansion external bus C. Both CPU 1 and JPEG expansion circuit 25 input the compressed video data from the network 40, expand the compressed video data and display the expanded reproduction image on a monitor 33. Alternatively, they can output or input the compressed video data inputted from the network 40 or its expanded video data to or from the add-in board of the expansion connectors 12 and 13. Incidentally, it is of course possible to replace the JPEG expansion circuit 25 by the MPEG expansion circuit in a system that uses the moving picture compression system MPEG. The audio signals can also be handled in the same way.

The expansion external bus C is provided besides the peripheral circuit bus B for the following reasons. If the add-in board is connected to the peripheral circuit bus B, the peripheral circuit bus buffer 2 and drivers of other connection circuits have to drive a large load, and each driver has to possess a relatively high driving capacity. If the driver of each connection circuit drives the large load with a relatively high driving capacity, a large driving current instantaneously flows. Consequently, reflection of signals on the bus, cross-talk noise, unnecessary radiation or fluctuation of the reference potential due to a feedback current to the driving source is more likely to develop, and high-speed signal transmission by the peripheral bus B becomes more difficult. For this reason, two buffers 2 and 6 restrict as much as possible the driving capacity of the signal transmission of the respective connection circuits on the CPU side to reduce the influences of a large driving current and to easily accomplish high-speed signal transmission. Similarly, the CPU bus A is disposed separately from the peripheral circuit bus B and the expansion external bus C for the following reason. If each connection circuit connected to the peripheral circuit bus B and to the expansion external bus C is to be connected to the CPU bus A, CPU 1 and drivers of other connection circuits have to drive a large load and high-speed signal transmission on the CPU bus A becomes impossible.

For the reasons described above, data exchange between the buses is made through the peripheral circuit bus buffer 2 or the expansion external bus buffer 6. Each connection circuit is connected to the respective bus to minimize the driving capacity of the driver of each connection circuit inside each bus. Each connection circuit is connected in series so as to reduce the driving current, to avoid discontinuity of transmission path characteristic impedance and to minimize reflection on the buses, unnecessary radiation and fluctuation of the reference potential resulting from the feedback current to the driving source. Needless to say, the bus buffers 2 and 6 can have a waveform shaping function.

In FIG. 3, reference numeral 21 denotes a series resistor inserted in series into the signal line of the series connection at the starting point of the CPU bus A positioned in the proximity of CPU 1. This resistor 21 is a circuit element that suppresses signal reflection or cross-talk noise. Reference numeral 22 denotes a terminating resistor connected to the signal line of the series connection at the end point of the CPU bus A. This terminating resistor 22 is a circuit element that suppresses signal reflection or cross-talk noise. Similarly, reference numeral 23 denotes a series resistor inserted in series into the signal line of the series connection at the starting point of the peripheral circuit bus B positioned in the proximity of peripheral circuit bus buffer 2. This resistor 23 is a circuit element that suppresses signal reflection or cross-talk noise. Reference numeral 24 denotes a terminating resistor connected to the signal line of the series connection at the end point of the peripheral circuit bus B. This terminating resistor 24 is a circuit element that suppresses signal reflection or cross-talk noise. Reference numeral 26 denotes a series resistor inserted in series into the signal line of the series connection at the end point of the peripheral circuit bus C positioned in the proximity of the peripheral circuit bus buffer 6. This terminating resistor 26 is a circuit element that suppresses signal reflection or cross-talk noise.

Next, the operation of the video transmission apparatus for connecting to a network according to the invention shown in FIG. 3 will be explained.

The central control circuit 4 reads the processing program data of CPU 1 from ROM 5 to RAM 3 during the initialization operation after the operating power source is supplied to the video transmission apparatus 30, and each processing is commenced under the control of CPU 1.

CPU 1 sets preset control information for setting the imaging condition (zooming, panning, tilting, etc) of the camera 14 or control information of the camera 14 inputted from a separate place through the network 40 to the serial control circuit 9. The camera 14 images a required range of the visual field under the control of these control information and supplies 30 fps video signals E as its output to the JPEG compression circuit 8. The JPEG compression circuit 8 executes A/D conversion of the 30 fps video signals E and data compression of the digital signals. For instance, the JPEG compression circuit 8 compresses 1-frame video data to compressed video data of at least 0.12 Mb/frame.

CPU 1 controls the JPEG compression circuit 8 in cooperation with the central control circuit 4 and transmits the compressed video data to RAM 3 at a data transmission rate of at least 3.6 Mbps in a cycle of 1/30 fps through the peripheral circuit B, the peripheral circuit bus buffer 2 and the CPU bus A. RAM 3 stores the compressed video data. CPU 1 applies predetermined formatting to the compressed video data so stored, and again stores it in RAM 3.

Next, CPU 1 executes the access control of equipment connected to these buses A, B and C in cooperation with the central control circuit 4. When the number of users is 4 for the transmission request of the users sent through the network, for example, the compressed video data formatted into a predetermined format is read out from RAM 3 at a data transmission rate of at least 3.6 Mbps×4=14.1 Mbps, and is transmitted to the network control circuit 7 through the CPU bus A, the peripheral circuit bus buffer 2 and the peripheral circuit bus B. Here, processing scheduling of CPU 1 or execution scheduling of the DMA transmission function is regulated lest this data transmission competes with transmission of the compressed video data from the JPEG compression circuit 8 described above. The network control circuit 7 converts the compressed video data formatted into the predetermined format to a format suitable for the communication protocol of the network and transmits it as data D to the network 40.

Next, each connection circuit involved in the sequence from data transmission of the compressed video data of the JPEG compression circuit 8 to RAM 3 to transmission of the video data of four users to the network 40, and timing examples of data transmission, will be explained with reference to FIG. 4.

Figure 4:
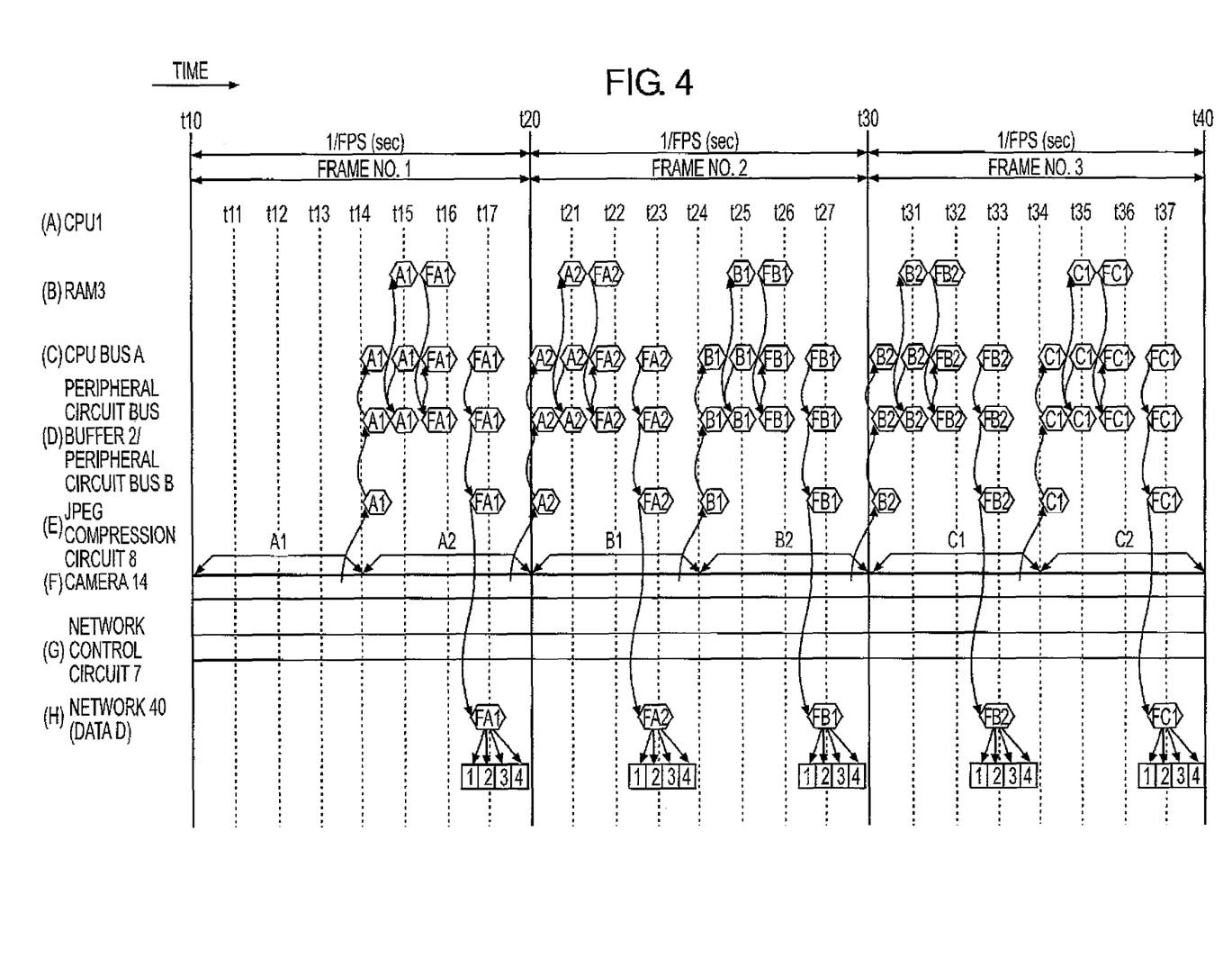
FIG. 4 is a timing chart showing an example of data transmission timing in a video transmission apparatus for connecting to a network according still another embodiment of the invention.

In FIG. 4, the number of video frames of the camera 14 is FPS (fps) and one-frame time is 1/FPS (sec) (one-frame time is about 33 ms when the number of frames FPS is 30 fps). In FIG. 4, the one-frame time is divided into 8 zones of tx0, tx1, tx2, . . . , tx7 (where x =1, 2, 3, . . . ). It will be assumed that after starting its operation at the time t10, the video transmission apparatus 30 for connecting to a network operates in synchronism with frame cycle 1/FPS (sec). It will be further assumed that the camera 14 images data by a progressive scan system.

The JPEG compression circuit 8 successively compresses the video signals from the camera 14 at a predetermined timing and temporarily stores them as compressed video data A1. When the time t14 corresponding to ½ time of one frame cycle is reached, the central control circuit 4 supplies a transmission start control signal to each connection circuit (not shown) in order to transmit the compressed video data A1 up to the ½ passage time of one frame cycle stored in the JPEG compression circuit 8 to RAM 3. Receiving this control signal, CPU 1 reads the compressed video data A1 through the peripheral circuit bus B, the peripheral circuit bus buffer 2 and the CPU bus A and stores it in RAM 3. Here, storage of the compressed video data Al to RAM 3 may be conducted by the DMA transmission function without passing through CPU 1.

After storing the compressed video data A1 to RAM 3, CPU 1 generates data FA1 by formatting the compressed video data A1 into a predetermined format in accordance with the four users at the destination. This data FA1 is stored in RAM 3 through the CPU bus A. In a time zone around the time t17, CPU 1 transmits this data FA1 to the network control circuit 7 through RAM 3, the CPU bus A, the peripheral circuit bus buffer 2 and the peripheral circuit bus B. The network control circuit 7 transmits the data FA1 as data D (which is represented by "1, 2, 3, 4" in FIG. 4H as the transmission data to the four users) to the network 40 towards the four users at the destination in accordance with a predetermined communication protocol.

When the time lapsed reaches the start time t20 of the next frame No. 2, the central control circuit 4 supplies the transmission start control signal to each connection circuit to transmit the compressed video data A2 of the latter half portion of the frame No. 1 that is stored in the JPEG compression circuit 8. Thereafter, CPU 1 and the central control circuit 4 execute transmission and storage of the compressed data (B1, B2, C1, C2, . . . ) and storage of the formatted data (FA2, FB1, FB2, FC1, . . . ) to RAM 3 in the same way and at the same timing as described above. As to the data FA2, CPU 1 transmits this data FA2 to the network control circuit 7 in the time zone around the time t23. The network control circuit 7 transmits the data FA2 as the data D to the network 40 towards the four users at the destination in accordance with a predetermined communication protocol. Thereafter, the compressed video data of the video signal of each frame is transmitted to, and stored in, RAM 3 through the JPEG compression circuit 8, the peripheral circuit bus B, the peripheral circuit bus buffer 2, the CPU bus A or CPU1 in the same way and at the same timing as described above. The compressed video data stored in RAM 3 is thereafter read out as the data formatted into a predetermined format from RAM 3, and is transmitted to the network control circuit 7 through the CPU bus A, the peripheral circuit bus buffer 2 and the peripheral circuit bus B. A series of these processing is repeated.

As described above, in transmission of compressed image data from the JPEG compression circuit 8 and transmission of delivery data to the network control circuit 7, each data transmission is conducted on the time division basis under processing scheduling of CPU 1 or execution scheduling of the DAM transmission function and under control of the central control circuit 4.

CPU 1 has to execute irregular processing besides these regular processing such as access control and transmission of the data. Receiving a camera control request (such as zooming, panning, tilting, etc), CPU 1 sets the camera control information to the serial control circuit 9. It further sets control signals for LED display for notifying the operation condition such as the number of users of the delivery request and the data transmission rate to outside, to the LED circuit 10. Furthermore, CPU 1 has to read out external information (designation of operation modes such as normal or test mode, reset request, number of users of simultaneous transmission, maximum transmission rate per user, etc) from the switch circuit 11 and to execute the changing processing of the operation mode and the parameters in order to prepare for switching of the operation mode and the change of the operation parameters.

When the add-in boards are mounted to the expansion connectors 12 and 13, CPU 1 has to execute data access control and data transmission processing with these boards.

Next, the bus buffers 2 and 6 will be explained in detail. High-speed data transmission of at least 14.4 Mbps must be conducted on the buses A, B and C so that the four users can simultaneously receive the transmission service of high quality reproduction images. When the elongated signal line from CPU 1 to the switch circuit 11 is connected by one bus, for example, distortion of signals is likely to develop and the upper limit of data transmission is determined. To improve this upper limit, the video transmission apparatus 30 for use with a network separates CPU 1 from the external peripheral block 32 by using the peripheral circuit bus buffer 2 and the expansion external bus buffer 6 for the reasons described above. Each connection circuit inside each block 31 and 32 is connected by the signal line of each bus A, B and C in series connection.

When the bus for each block in the bus buffer 2 or 6 shown in FIG. 3 connects each connection circuit, the signal line becomes short and the reciprocation time of the signal becomes short, too (adverse influences such as reflection can be reduced when signal rise time tr and fall time tf > reciprocation time τ). Further, unnecessary branching signal wire does not exist due to series connection, transmission path characteristic impedance can be rendered constant and a load to driving can be lowered to reduce a driving current. In consequence, signal reflection, cross-talk noise, unnecessary radiation and fluctuation of the reference potential due to the feedback current to the driving source can be suppressed.

Therefore, the upper limit of the data transmission rate can be improved in each block 31 and 32. The series resistor 21 as a dumping resistor of several to dozens of ohms can be connected in series with the starting point of the CPU bus A at a position close to CPU 1 and the terminating resistor 22 as a circuit element of dozens to hundreds of ohms equivalent to the transmission path characteristic impedance of the CPU bus A can be interposed between the power source and the ground. Further, because the occurrence of reflection of the transmission signal and cross-talk noise can be suppressed, the upper limit of the data transmission rate can be improved. The series resistors 23 and 26 as the dumping resistor and the terminating resistors 24 and 27 as the circuit element equivalent to the transmission path characteristic impedance of each bus are similarly arranged in the buses B and C.

Next, each connection circuit and packaging of the signal line for connecting in series each connection circuit that achieves a high data transmission rate will be explained with reference to FIGS. 1 and 2.

Figure 1:
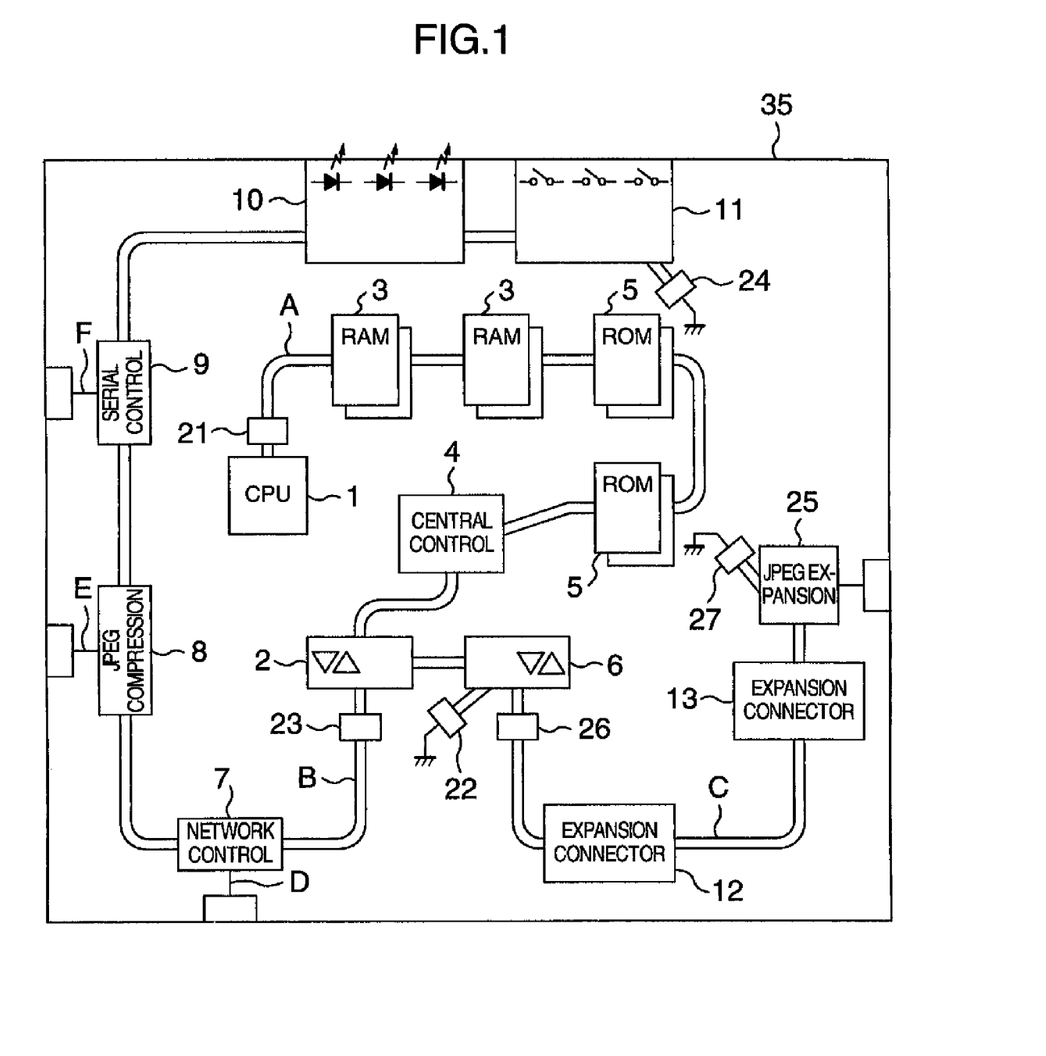
FIG. 1 shows a packaging structure of a video transmission apparatus for connecting to a network according to one embodiment of the invention.
Figure 2:
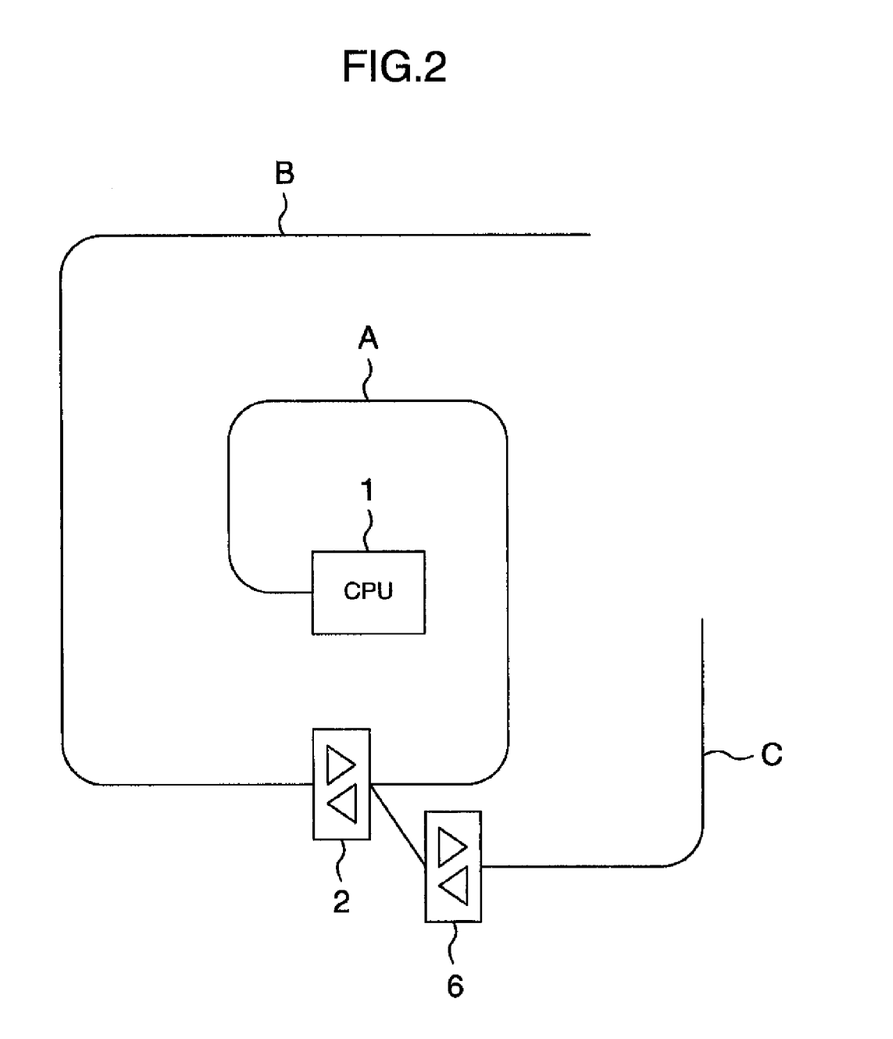
FIG. 2 shows a concept of a packaging system of a video transmission apparatus for connecting to a network according another embodiment of the invention.

FIG. 2 is a conceptual view that shows a packaging system of the signal line of series connection of the buses for connecting each connection circuit shown in FIG. 3. In FIG. 2, CPU 1 is shown arranged at a substantial center, and the buses are spirally wired in series connection in such a fashion as to expand towards the outer periphery with CPU 1 as the starting point. The CPU bus A, the peripheral circuit bus B and the expansion external bus C exchange data with one another through the peripheral circuit bus buffer 2 and the expansion external bus buffer 6 in the same way as in FIG. 3. FIG. 1 shows an example of the packaging structure in which the signal lines of the series connection of each connection circuit and each bus shown in FIG. 3 are arranged on a printed board in accordance with the packaging system of the signal lines of the series connection of each bus in FIG. 2.

FIG. 1 shows the packaging structure according to the invention. In FIG. 1, reference numeral 35 denotes the printed board on which the signal lines of the series connection of each connection circuit and each bus for connecting the connection circuits in the video transmission apparatus 30 for connecting to the network shown in FIG. 3 are packaged. The printed board may be a single-layered board or a multi-layered board. The signal lines may be formed on and/or inside the board by using a known pattern packaging technology. Each connection circuit is connected to the bus wired in the series connection in such a fashion as to spirally expand from the arrangement position of CPU 1 as the starting point towards the peripheral part of the printed board 35. When the signal lines cannot be wired on (or inside) the same layer, the series connection of the signal lines can be naturally achieved by using a plurality of layers through through-holes or vias, not shown. The CPU bus A, the peripheral circuit bus B and the expansion external bus C exchange data with one another through the peripheral circuit bus buffer 2 and the expansion external bus buffer 6. "HD74LVC245", a product of Hitachi, Ltd, is commercially available as the IC for the buffers, for example. The peripheral circuit bus B and the expansion external bus C connect each connection circuit of the peripheral block 32, that is positioned at the outermost peripheral portion of the printed board 35 for data exchange. For example, the buses A, B and C are 64, 32 and 16 bit buses, respectively.

In other words, the CPU block 30 is arranged at the substantial center of the printed board 35 and the peripheral block 32, at the peripheral part of the CPU block 30. When each connection circuit of the peripheral block 32 is arranged at the peripheral part of the printed board 35, signal cables for exchanging the signals with outside of the printed board 35 can be easily accepted, and the blinking condition of the LED circuit 10 for notifying the operation mode of the switch 11 designating the operation mode and the operation condition of the apparatus can be more easily recognized.

The arrangement of each connection circuit is as follows. Namely, RAM 3, ROM 5, the central control circuit 4, the peripheral circuit bus buffer 2 and the expansion external bus buffer 6 of the connection circuit for which higher speed access is required are arranged in this order with CPU 1 as the starting point. Further, the network control circuit 7, the JPEG compression circuit 8 and the serial control circuit 9 of the circuit for which higher speed access is also required are arranged from the peripheral circuit bus buffer 2 towards the peripheral part of the printed board 35. The LED circuit 10 and the switch circuit 11 that permit the slowest access are arranged at the peripheral part. The expansion external bus C of the signal lines of the series connection connect the expansion connectors 12 and 13 and the JPEG expansion circuit 25 with the expansion external bus buffer 6 as the starting point at the peripheral portion of the printed board 35. The connection circuit for which higher speed access is required is arranged closer to CPU 1 or to the bus buffers 2 and 6 so as to shorten as much as possible the signal transmission distance and to minimize the signal propagation delay. In this way, the setup time and the hold time of the reception signals on the driver side of CPU 1 are secured and signal input/output can be reliably made in high-speed signal transmission.

The series resistors 21, 23 and 26 as the dumping resistors for suppressing signal reflection and cross-talk are inserted in series into the signal line of the series connection close to CPU 1 or to the peripheral circuit bus buffer 2. The terminating resistors 22, 24 and 27 equivalent to the transmission path characteristic impedance of each bus are interposed between the power source line and the ground in each bus.

The operation of the video transmission apparatus for connecting to a network using each connection circuit and the signal lines of the series connection of each bus for connecting the connection circuits is the same as the operation shown in FIG. 3, and its explanation will be omitted.

This embodiment can transmit at least simultaneously the compressed video data of 3.6 Mbps (=0.12 Mb×30 fps) per user to the four users through the network, can accomplish data transmission of 3.6 Mbps×4 =14.4 Mbps, and can achieve the service capable of providing high quality reproduction images having natural motion to each user.

The peripheral block connected by the bus of the signal line of the series connection that accomplishes a data transmission rate of at least 14.4 Mbps can be arranged at the peripheral part of the printed board. Therefore, the connectors for the external interface, the display for displaying the operating condition or the switch for setting the operation condition can be directly mounted to the printed board. Alternatively, it is no longer necessary to mount the switch, or the like, to a separate printed board and to connect the board through cables. After all, the invention can accomplish a video transmission apparatus for connecting to a network that can simplify the construction of a casing and can reduce the cost.

It should be further understood by those skilled in the art that the foregoing description has been made on embodiments of the invention and that various changes and modifications may be made in the invention without departing from the spirit of the invention and scope of the appended claims.

The invention claimed is:

1. A video transmission apparatus for connecting to a network, comprising:

a central processing unit block; and a peripheral block, wherein said peripheral block includes a video processing unit for processing video signals from an image picking-up device and generating video data, a network control unit for controlling transmission and reception of said video data transmitted and received through a transmission medium inclusive of a network, and a first bus for providing a daisy-chain type connection such that video data output by said video processing unit is input to said network control unit, without any branch of said video processing unit and said network control unit wherein said central processing unit block includes a central processing unit for processing said video data, a storage unit for storing video data from said video processing unit, a central control unit for controlling said video processing unit, said network control unit and said storage unit in cooperation with said central processing unit to control transmission or reception of video data in accordance with instructions from said central processing unit, and a second bus for providing a daisy-chain type connection of said central control unit, said storage unit and said central processing unit such that data received from said network control unit is output to said storage unit and video data output from said storage unit is input to said central processing unit, and wherein said first bus and said second buses are connected to each other in series through a first bus buffer.

2. A video transmission apparatus according to claim 1, wherein said central processing unit and said central control unit control said video processing unit, process the video signals from said image picking-up device and store the compressed video signals in a cycle of 1/30 fps and at a data transmission rate of at least 3.6 Mbps in said storage unit through said first bus, said first bus buffer and said second bus.

3. A video transmission apparatus according to claim 1, wherein said central processing unit and said control unit read out compressed video data from said storage unit at a data transmission rate of at least 14.4 Mbps for a request of four users from said network control unit, and transmit said compressed video data to said network control unit through said second bus, said first bus buffer and said first bus.

4. A video transmission apparatus according to claim 1, wherein a second bus buffer is further connected to said second bus, and a third bus having expansion connectors connected thereto is connected to said second bus buffer.

5. A video transmission apparatus according to claim 4, wherein a video expansion unit is connected to said expansion connectors of said third bus, and a monitor is connected to said video expansion unit.

6. A video transmission apparatus according to claim 1, wherein said second bus provided to said central processing block unit connects said central processing unit, said storage unit, said central control unit and said first bus buffer in order named, and said first bus provided to said peripheral block connects said first bus buffer, said network control unit and said video processing unit in order named.

7. A video transmission apparatus according to claim 6, wherein said first bus further provides a series connection of a circuit for displaying an operating condition of said video transmission apparatus and a switch circuit for setting an operation of said video transmission apparatus.

8. A video transmission apparatus according to claim 1, wherein a dumping resistor is connected to a starting point or an end point of each of said first and second buses and a terminating resistor is connected to the other.

9. A video transmission apparatus according to claim 1, wherein said peripheral block and said central processing unit block are arranged on the same packaging board, said central processing unit and said central control unit are positioned at said central processing unit block which is located at a substantial center of said packaging board, and said peripheral block is disposed at a peripheral area of said central processing unit block of said packaging board.

* * * * *